United States Patent [19]
Goodrich

[11] 4,426,789
[45] Jan. 24, 1984

[54] NAVIGATION POSITION PLOTTER

[76] Inventor: Lloyd P. Goodrich, 3929 Woodhall, Detroit, Mich. 48224

[21] Appl. No.: 448,800

[22] Filed: Dec. 10, 1982

[51] Int. Cl.³ .................. B43L 13/02; G01C 21/20
[52] U.S. Cl. .................................. 33/431; 33/444; 33/448; 33/DIG. 9; 33/1 C
[58] Field of Search ............... 33/431, 444, 448, 449, 33/450, 1 B

[56] References Cited
U.S. PATENT DOCUMENTS

| | | | |
|---|---|---|---|
| 1,414,002 | 4/1922 | Turner et al. | 33/444 |
| 2,300,401 | 11/1942 | Basler et al. | 33/DIG. 9 |
| 2,403,614 | 7/1946 | Ross | 33/DIG. 9 |
| 2,530,428 | 11/1950 | Gray | 346/33 |
| 2,756,929 | 7/1956 | McGee | 33/431 |

FOREIGN PATENT DOCUMENTS 113082 1/1944 Switzerland ............... 33/DIG. 9

Primary Examiner—Willis Little
Attorney, Agent, or Firm—Basile, Weintraub & Hanlon

[57] ABSTRACT

A navigation position plotter for determining the navigation coordinates of a point on a navigation chart and plotting the position of a point on the navigation chart. A plate bearing navigation scales divided into increments between two spaced grid lines on the navigation chart is mounted on a frame. A first plotting bar is movably mounted on the frame. A second plotting bar is pivotally mounted on the frame and intersects the first plotting bar. The frame is position over the chart such that the navigation coordinate increment underlying the second plotting bar can be read after the first and second plotting bars have been moved into intersecting relationship over the point to be plotted.

12 Claims, 5 Drawing Figures

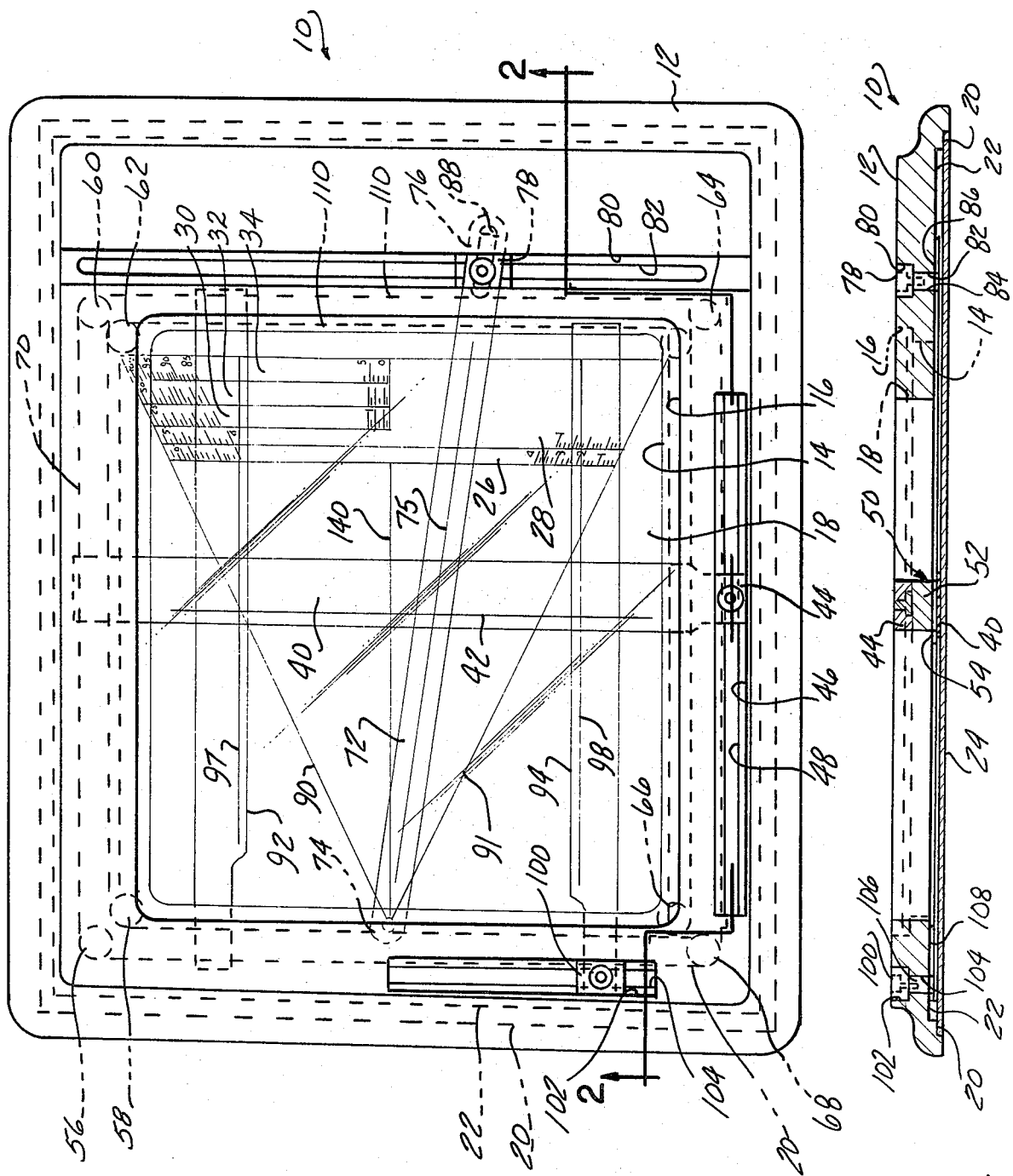

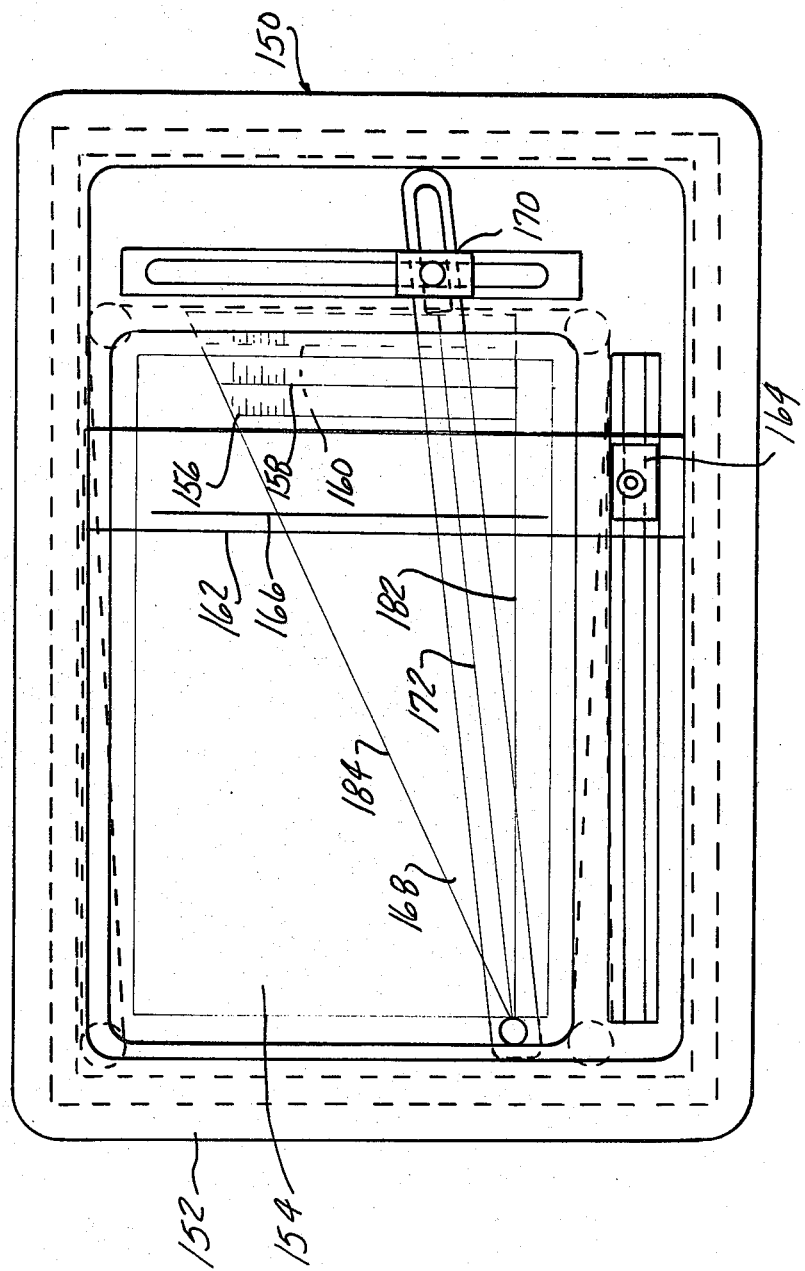

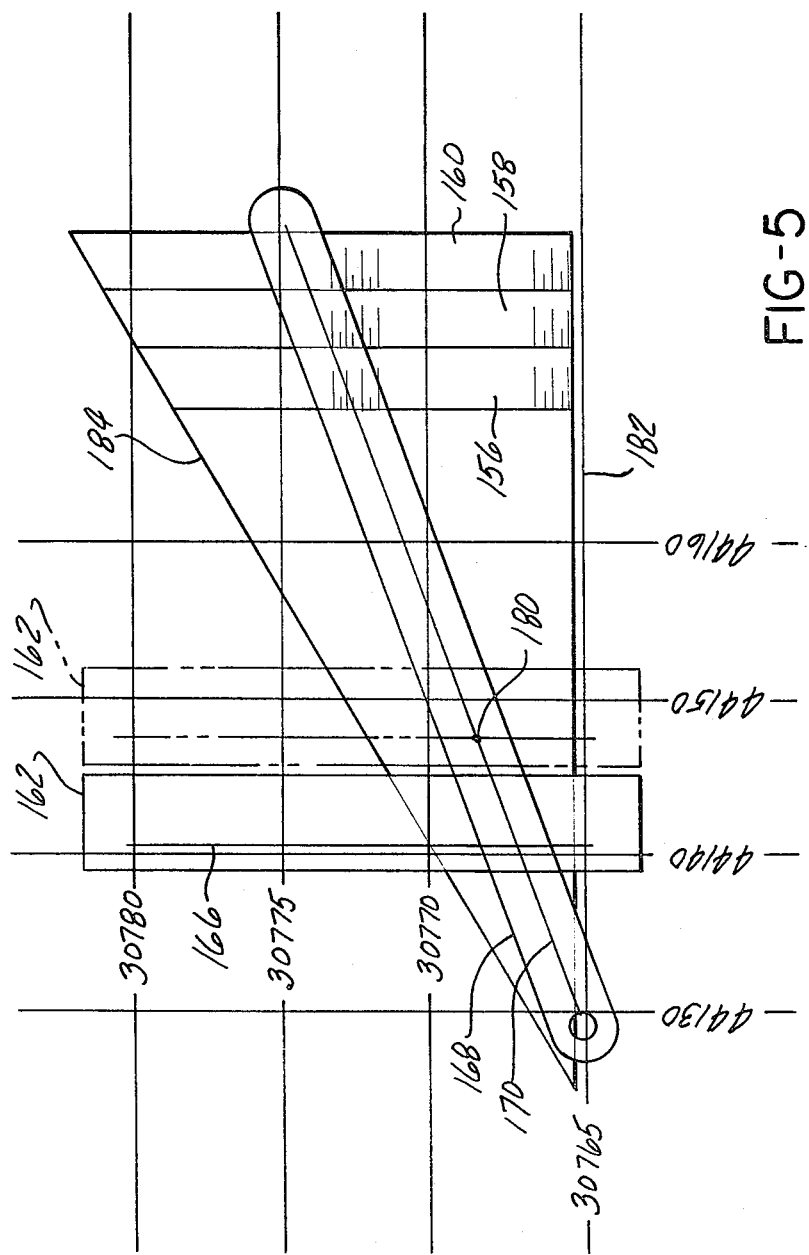

NAVIGATION POSITION PLOTTER

BACKGROUND OF THE INVENTION

1. Field of the Invention

This invention relates, in general, to navigation apparatus, and specifically, to apparatus for determining the coordinates of a predetermined position on a navigation chart.

2. Description of the Prior Art

Various methods and devices have been developed for determining the position of a ship or object on the surface of the earth. In determining the coordinates of the position on the surface of the earth, various sightings and other mesurements are taken to determine the exact longitude and latitude of the ship or object. These coordinates are applied to a navigation chart which is divided into spaced latitude grid lines and spaced longitude grid lines. However, due to the large spacing on some of the charts between the adjacent longitude and latitude lines an interpolation scale having incremental markings dividing the distance between two adjacent grid lines is used to locate the exact position of the object between the two spaced latitude and longitude lines.

Another navigation system in widespread use is the so-called long range navigation system or Loran in which pairs of transmitters are positioned on the surface of the earth and transmit timed pulses which are received by Loran receivers mounted on ships or other moving objects. The difference in arrival time of the pulses from the pair of transmitters is then used to locate the position of the ship or object along two spherical hyperbolas having their loci at the respective pairs of transmitters. The intersection of the two hyperbolas fixes the position of the object.

Charts are provided having families of hyperbolas plotted thereon corresponding to each pair of transmitters. The hyperbolas for each transmitter are spaced apart on the chart at a predetermined time difference or interval, typically one hundred microseconds. The navigator needs only take the indicated time difference of the signal received from one of the pair of transmitters and interpolate the difference between two adjacent hyperbolas of the family of hyperbolas corresponding to the transmitter closest to the measured time difference for that family of hyperbolas.

An interpolation scale printed on the chart provides scaled increments between adjacent time delay interval lines on the chart. Using a pair of dividers or a ruler, the navigator need only measure the indicated time difference on the interpolation scale and plot the measured distance on the chart to determine one position coordinate.

Although automatic navigation apparatus have been devised which automatically determine the exact position coordinates, either latitude or longitude or Loran time intervals, such equipment is expensive and it is still necessary to plot the position on the chart by using interpolation scales. In using interpolation scales, repeated measurements by means of a divider or ruler are required to interpolate the position between the adjacent grid lines. This is, at best, a time consuming task and one which is prone to numerous measurement errors.

Thus, it would be desirable to provide a navigation apparatus for plotting the position of an object which overcomes the problems of previously devised navigation position plotting apparatus. It would also be desirable to provide a navigation apparatus which determines the interpolated latitude and longitude or Loran time interval coordinates of a predetermined position on a chart between adjacent pairs of latitude and longitude lines or Loran time interval lines. It would also be desirable to provide a navigation apparatus which enables the position of an object to be plotted once the latitude and longitude or Loran time interval coordinates are known. Finally, it would be desirable to provide a navigation position plotting apparatus in which the position coordinates of an object or point on a navigation chart are easily obtained with a minimum number of steps.

SUMMARY OF THE INVENTION

There is disclosed herein a unique navigation position plotter suited for use with navigation charts bearing spaced and intersecting navigational grid lines, such as longitude and latitude lines or families of Loran time delay interval lines. The navigation position plotter of the present invention is suited for use in determining the coordinates of a predetermined point on the chart or for plotting the position of an object on the navigation chart.

The navigation position plotter of the present invention includes a frame having a centrally located aperture. A plate mounted on the frame carries scales which are divided into increments corresponding to incremental graduations between two adjacent grid lines on the chart. The scales are preferably provided in longitude and latitude degree minute and seconds designations and/or Loran time delay intervals.

A first plotting bar is slidingly mounted on the frame for movement across the frame. The first plotting bar carries a first plot line thereon. A second plot bar is pivotally mounted on the frame at one end and movably intersects the first plotting bar. The second bar carries a second plot line which overlays the scales on the plate at one end. Finally, means are provided for positioning the frame over the chart with respect to the position to be plotted such that the incremental coordinates of the position to be plotted between two adjacent grid lines on the chart underlie the second plot line when the first and second plot lines are disposed in intersecting relationship over the point to be plotted.

Preferably, the positioning means includes means for aligning the frame over one grid line on the chart adjacent to the position to be plotted and a first scale line formed on the plate at a predetermined angle with respect to the first plot line. The first scale line cooperates with the aligning means and the first plot line to establish the position of the first plot line on the frame with respect to the spacing between two grid lines between which is located the position to be plotted.

In a preferred embodiment, the aligning means includes at least one and preferably two members which are movably mounted on the frame and disposed substantially perpendicular to the first plotting bar. Base lines are formed on each movable member. The movable members are interconnected for simultaneous movement towards and away from each other. In use, the movable members are positioned over two spaced grid lines on the chart to correctly orient the frame on the chart.

The navigation position plotter of the present invention overcomes many of the problems associated with previously devised navigation position plotting apparatus. The plotter of the present invention enables the coordinates of the predetermined position on a navigation chart to be easily and quickly obtained. Furthermore, the position of any object on the surface of the earth can be quickly and easily plotted on the chart without the need for the numerous manual steps utilizing dividers and rulers which have been required with prior art navigation plotting devices. More importantly, the navigation plotting position apparatus of the present invention is adaptable for use with any spacing between adjacent longitude and latitude lines as well as Loran time delay interval lines currently found on navigation charts.

BRIEF DESCRIPTION OF THE DRAWING

The various features, advantages and other uses of the present invention will become more apparent by referring to the following detailed description and drawing in which:

FIG. 1 is a plan view of one embodiment of a navigation position plotter constructed in accordance with the teachings of the present invention;

FIG. 2 is a cross sectional view generally taken along line 2—2 in FIG. 1;

FIG. 4 is a plan view of another embodiment of the navigation plotter of the present invention; and FIG. 5 is a pictoral representation of the use of the navigation position plotter shown in FIGS. 1 and 4 in determining Loran time delay interval coordinates of a predetermined point on the navigation chart.

DESCRIPTION OF THE PREFERRED EMBODIMENTS

Figure 3:
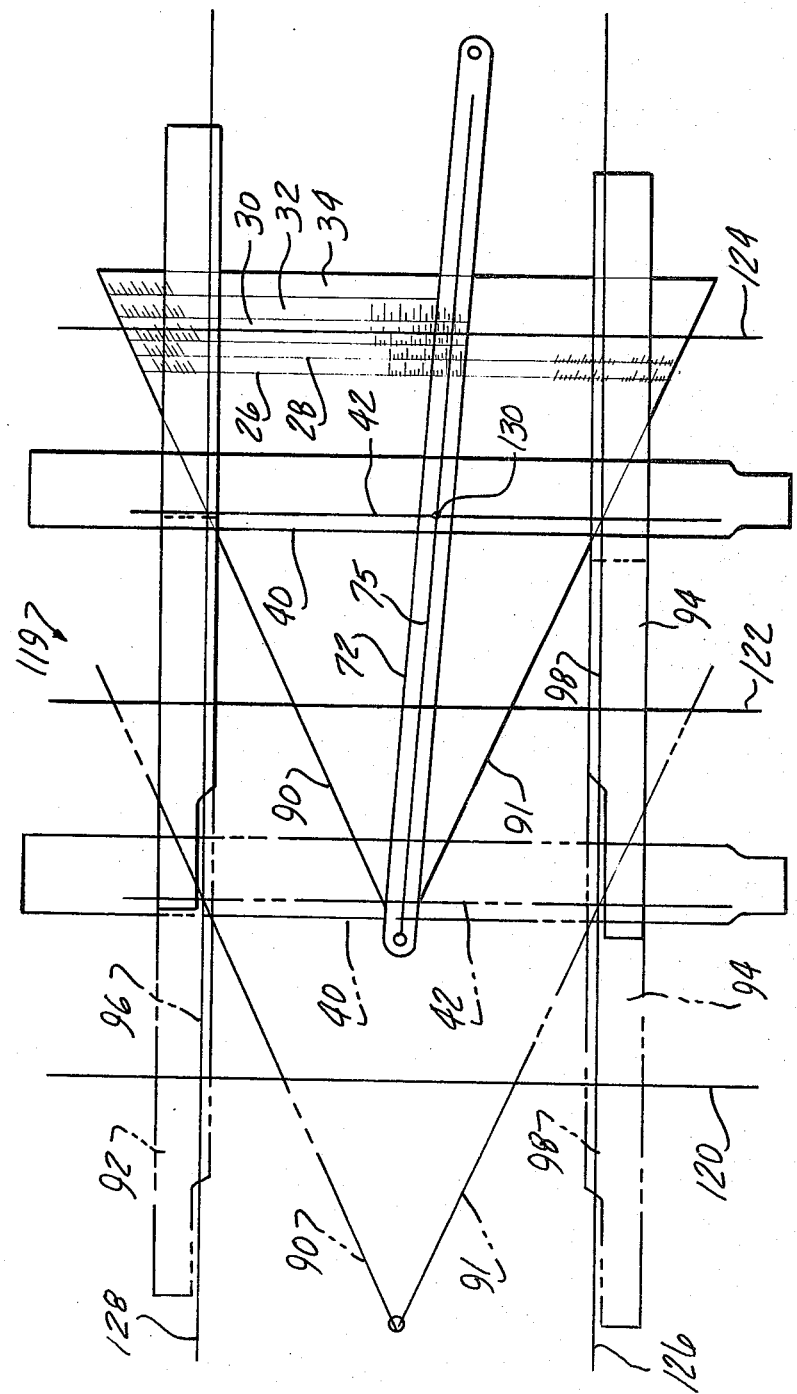
FIG. 3 is a pictoral representation of the use of the navigation position plotter shown in FIGS. 1 and 2 in determining the coordinates of a predetermined point on the navigation chart.

Through the following description and drawing, an identical reference number is used to refer to the same component shown in multiple figures of the drawing.

As shown in the drawings, the navigation position plotter of the present invention is suited for use with a navigation chart having spaced grid lines, such as longitude and latitude lines or Loran time delay interval lines and for determining the incremental coordinates of a predetermined position on the chart located between two adjacent grid lines.

As shown in FIGS. 1, 2 and 3, the navigation position plotter 10 of one embodiment of the present invention includes a frame 12 having a substantially rectangular configuration. The frame 12 may be formed of any suitable material such as plastic, wood, metal, etc. A central aperture 14 having a substantially square configuration is formed in the frame 12.

The top surface of the central aperture 143 has a recessed portion 16 formed therein which forms a shoulder which is adapted to receive and support a transparent cover plate 18. Further, a first recessed portion 20 is formed about the periphery of the bottom surface of the frame 12 and forms a first cutaway portion. A second recess 22 is also formed in the bottom portion of the frame 12 and extends inward and upward from the first recess 20.

A planar plate member 24 is mounted within the first recessed portion 20 of the frame 12 and is secured in position by any conventional means, such as by the use of an adhesive. The plate member 24 is formed of a suitable transparent material, such as plastic or glass, and has various navigation scale indicia formed thereon. Preferably, a plurality of scales are provided on the plate member 24 to enable the navigation position plotter 10 of the present invention to be used on an assortment of charts which have different grid line spacings. All of the navigational scales are divided into a series of graduated increments which correspond to incremental graduations between two adjacent, spaced grid lines on a navigational chart.

In a preferred embodiment, as shown in FIG. 3 two scales 26 and 28 are formed on the plate member 24 and are graduated for longitude and latitude degree minutes and seconds, with one scale 26 being divided into a thirty minute increment; while the other scale 28 is divided into a five minute increment. Additional scales 30, 32 and 34 are also preferably, formed on the plate member 24 and are divided into Loran time delay interval increments, typically measured in micro seconds. As shown in FIG. 1, the Loran time delay interval scales 30, 32 and 34 extend only from a mid point of the plate 24 upward to the top edge of the plate 24. The time delay interval scales 30, 32 and 34 are divided into various increments to correspond to different time delay interval spacings found on navigation charts provided with families of Loran time delay interval lines.

A first plotting bar 40 is slidingly mounted on the frame 12 of the navigation position plotter 10 of the present invention and is adapted for movement across the frame 12. The first plotting bar 40 is in the form of a planar member and has a first plot line 42 formed thereon which may be the edge of the bar 40 or a separate line formed on the bar 40. The first plotting bar 40 is preferably formed of a transparent material, such as plastic or glass, so as to enable the chart and scales to be seen therebeneath.

Means are provided for moving the first plotting bar 40. Preferably, the moving means comprises a slider member 44 which is slidingly mounted within a recessed shoulder portion 46 of a slot 48 formed in the frame 12. A connector 50 having a first portion 52 extending through the slot 48 is connected to the slider member 44 by means of a fastener which extends through an aperture formed in the slider 44. A flange 54 is formed on the end of the first portion 52 of the connector 50 and carries one end of the first plotter bar 40 on one side so as to slidingly mount one end of the first plotting bar 40 on the frame 12.

The moving means also includes a plurality of pulleys which are rotatably mounted on the underside of the frame 12. As shown in FIG. 1, a plurality of pulleys 56, 58, 60, 62, 64, 66 and 68, some of which may be double pulleys, are utilized. An elongated, continuous cable 70 extends through the various pulleys. The cable 70 extends from pulley 56 around pulley 60 and is secured therebetween to the underside of one end of the first plotting bar 40 by means of a suitable adhesive. The cable 70 is then looped around pulleys 60, 58 and 66 and cosecured to the opposite end of the first plotting bar 40 before passing around pulley 64. The cable 70 then extends from pulley 64 around pulley 68 and back to pulley 56 thereby completing the loop. Due to the connection of the cable 70 to both ends of the first plotting bar 40, movement of the first plotting bar 40 by means of the slider 44 will result in simultaneous and equal movement of both ends of the first plotting bar 40 across the frame 12 thereby insuring that the first plotting bar 40 remains in the same orientation throughout its movement.

A second plotting bar 72 having first and second ends 74 and 76 is pivotally mounted to the frame 12 at a first end 74. The second plotting bar 72 movably intersects the first plotting bar 40 and bears a second elongated plot line 75 in the form of an edge or a separate line formed on the bar 72 which overlies the scales 26, 28, 30, 32 and 34 at one end.

Means are provided for moving the second plotting bar 72 about the first end 74. Preferably, the moving means comprises a slider 78 which is slidingly received within a recessed portion 80 of a slot 82 formed in the frame 12. A connector 84 extends through the slot 82 and is secured to the slider 78 by means of a threaded fastener which extends therebetween. The opposite end of a connector 84 has an elongated planar flange portion 86 which supports the second end 76 of the second plotting bar 72. The second end 76 of the second plotting bar 72 has an elongated slot 88 formed therein which slidingly fits about connector 84 such that movement of the slider 78 within the slot 82 will result in pivotal movement of the second plotting bar 72 about its first end 74.

Means, carried by the frame, are provided for positioning the frame over a navigation chart with respect to a position on the chart to be plotted. Preferably, the positioning means includes means for aligning the frame 12 over at least one grid line on the chart adjacent to which the position to be plotted is located. Also, the positioning means includes a first scale indicia line 90 formed on the plate 24 which is oriented at a predetermined angle with respect to first plot line 42. Preferably, the first scale line 90 is disposed at a 25° angle with respect to the first plot line 42.

In one embodiment, as shown in FIG. 1, the aligning means includes one and preferably two movable members 92 and 94 which are slidingly mounted on the frame 12 and are oriented perpendicular to the plotting bar 40. Each of the movable members 92 and 94 has a base line indicia 96 and 98, respectively, formed thereon. The movable members 92 and 94 are positionable such that the base lines 96 and 98 may be positioned over two adjacent spaced grid lines on the navigation chart to accurately position the frame 12 on the chart.

In this embodiment, a second scale indicia line 91 is also joined on the plate 24 and is disposed approximately 50° from the first scale line 90. The first and second scale lines 90 and 91 define the upper and lower ends of the scales 26 and 28.

Preferably, the movable members 92 and 94 are interconnected for simultaneous movement towards and away from each other. A slider member 100 rides within the recessed portion 102 of a slot 104 formed in the frame 12. A fastener extends through the slider 100 and secures the slider 100 to a connector 106 having an elongated flange portion 108 formed in a bottom surface thereon. One end of the movable member 98 is secured, such as by an adhesive, to the elongated flange portion 108 of the connector 106 such that movement of the slider 104 causes sliding movement of the movable member 98.

A continuous cable 110 is slidingly interconnected between various ones of the pulleys and opposite ends of the movable members 92 and 94 for effecting simultaneous movement of the movable members 92 and 94 upon movement of the slider 100. Preferably, the cable 110 extends around double pulley 58, double pulley 66, pulley 64 and back towards pulley 62. The cable 110 then loops around the pulleys 62, 58 and 68 before returning to pulley 56. The left most end, as viewed in FIG. 1, of the movable member 94 is connected to the portion of cable 110 extending between pulleys 68 and 56. Likewise, the opposite end of the movable member 94 is connected to the portion of the cable 110 extending between pulleys 64 and 62. The ends of the other movable member 92 are secured to the portion of the cable 110 extending between pulleys 58 and 68 and the portion of the cable 110 extending pulleys 60 and 64, respectively. In this manner both movable members 92 and 94 move simultaneously towards and away from each other so as to enable the base lines 96 and 98 to be accurately positioned over two spaced, adjacent grid lines on a navigation chart.

Referring now to FIG. 3, the operation of the navigation position plotter 10 shown in FIG. 1 will now be described for determining the longitude and latitude coordinates of a predetermined position on a navigation chart. As shown in FIG. 3, there is illustrated a portion of a navigation chart 119 having spaced longitude lines 120, 122, and 124 and spaced latitude lines 126 and 128. As is well known, each of the latitude and longitude lines are provided with designations indicating the respective degrees of latitude and longitude. In order to determine the exact coordinates of a predetermined point, such as point 130, on the chart, it is necessary to determine the incremental spacing of the predetermined point 130 between two spaced latitude lines and two spaced longitude lines.

In determining the incremental latitude and longitude coordinates in degree minute and seconds of the predetermined point 130, the navigation position plotter 10 is initially positioned over the chart 119 in proximity with the point 130.

The movable members 92 and 94 are then positioned, as shown in phantom in FIG. 3, such that their respective base lines 96 and 98 are located over the two spaced latitude lines 126 and 128 disposed on opposite sides of the point 130. The first plotting bar 40 is then moved across the frame 12 until the first plot line 42 intersects the point where the first and second scale lines 90 and 91 intersect the base lines 96 and 98 on the movable members 92 and 94, respectively. This determines the grid spacing between the two latitude lines 126 and 128.

The plotter 10 is then moved in its entirety across the navigational chart 19 until the first plot line 42 intersects point 130, as shown in solid lines in FIG. 3, while maintaining the base lines 96 and 98 over the respective latitude lines 128 and 126 on the chart. The second plotting bar 72 is then pivoted about its first end 74 until the second plot line 75 intersects the point 130. The latitude increment is then read from the appropriate scale 26 or 28 underlying the second plot line 75 to determine the incremental latitude coordinate of the predetermined point 130 which is then added or subtracted to the latitude coordinate of the lines 126 or 128 to give the exact latitude of the point 130.

The plotter is then rotated 90 degrees above and the listed procedure is repeated to determine the incremental longitude component of the predetermined point 130.

The position plotter 10 of the present invention may also be used to plot the actual position of an object or point on a navigation chart when the latitude and longitude coordinates of the objector point are known. The above procedure is followed except that the second plotting bar 72 is pivoted until the second plot line 75 intersects the specified latitude or longitude increment between the two spaced latitude or longitude lines. The point to be plotted then is located at the intersection of the first and second plot lines 42 and 75, respectively.

The navigation position plotter 10 illustrated in FIG. 1 may also be utilized to determine the Loran time delay interval coordinates of a predetermined point on a navigational chart. Referring again to FIG. 1, in order to determine the Loran time delay interval coordinate, the means for aligning the frame 12 on the chart includes a base line indicia 140 which is formed on the plate 24 and extends substantially perpendicular to the first plot line 42.

Before commencing with a detailed description of the procedure and use of the position plotter 10 of the present invention in determining the Loran time delay interval coordinates of a predetermined position, a second version of a navigation position plotter constructed in accordance with the teachings of the present invention will be initially described since both versions operate in the same manner to determine the Loran time delay interval coordinates of a predetermined point.

Referring now to FIG. 4, there is illustrated a navigation position plotter 150 constructed in accordance with the teachings of another embodiment of the present invention which is utilized to determine the Loran time delay interval coordinates of a predetermined point on a navigational chart. The navigation position plotter 150 is constructed substantially identical to the position plotter 10 illustrated in FIG. 1 but without the movable members 92 and 94 and the interconnecting pulleys and cable. Thus, the position plotter 150 includes a frame 152, a plate 154 having Loran time delay interval incremental scales 156, 158, and 160 formed thereon which are identical to the scales 30, 32 and 34 shown in FIG. 1. A first position plotting bar 162 is slidingly mounted on the frame 152 and is moved by means of a slider 164 constructed identical to slider 44 shown in FIG. 1. The first plotting bar 162 carries a first plot line 166 thereon. A pivotal second plotting bar 168 is mounted on the frame 152 and is moved by means of a slider and connector assembly 170 which is identical to the slider and connector 78 and 84 shown in FIGS. 1 and 2. The second plotting bar 68 has a second plot line 172 formed thereon.

Pulleys and an interconnecting cable are provided for moving the first plotting bar 162 across the frame 152 in substantially the same manner as described above with reference to the first plotting bar 40 shown in FIG. 1.

Referring now to FIG. 5, the operation of both navigation position plotters 10 and 150 in determining the Loran time delay incremental coordinates of a predetermined point on a navigation chart will now be described. As the operative components of both position plotters 10 and 150 function in the same manner to determine the Loran time delay interval coordinate, the following discussion will be provided only with respect to the position plotter 150, with any exceptions being noted for the position plotter 10.

Initially, the plotter 150 is positioned over the chart such that base line 182 formed on the plate 24 is positioned over the time delay interval line immediately beneath the point 180 to be plotted. The first plotting bar 162 is then moved across the frame 152 until the first plot line 166 crosses the scale line 184 at the point where the scale line 184 intersects the time delay line immediately above the lower time delay line and the base line 182. The plotter is then moved in its entirety across the chart, keeping the base line 182 over the lower time delay interval line, until the plot line 166 intersects the point 180, as shown in phantom FIG. 5. The second plotting bar 168 is then pivoted until the second plot line 172 intersects the point 180. The time delay interval increment is then read from the appropriate scale 156, 158 or 160.

The plotter is then rotated 90 degrees and the above-described procedure is again performed to obtain the other time delay interval incremental coordinate of the point 180.

The same procedure can be used on the plotter 10 shown in FIG. 1 in determining Loran time delay interval coordinates except that the base line 140 is placed over the time interval line immediately below the predetermined point and the first plotting bar 40 is moved right or left until the first plot line 42 intersects the first scale line 90 at the point with the first scale line 90 intersects the adjacent upper time interval line.

Substantially the same procedure can be applied using the position plotter of the present invention to plot a point on a navigation chart when the Loran time delay interval coordinates of the point are known. As with longitude and latitude coordinates described above, after the plotter is positioned over the chart, the second plotting bar 168 is moved such as the second plot line 172 intersects the appropriate time delay interval coordinate between two spaced time delay interval lines on the chart. The intersection of the second plot line 172 and the first plot line 166 determines the position of the point to be plotted.

Thus, there has been described a unique navigation position plotter which easily and quickly determines the navigation position coordinates of a predetermined point on a navigation chart. The navigation position plotter of the present invention is equally suited for determining both latitude and longitude coordinates as well as Loran time delay interval coordinates. The navigation position plotter may also be applied to plotting the position of a point on a chart when the latitude and longitude or the Loran time delay interval coordinates are known.

What is claimed is:
1. A navigation position plotter for use with a navigation chart bearing spaced navigation grid lines comprising:
   a frame;
   a plate mounted on the frame;
   a scale formed on the plate having designations corresponding to incremental graduations between two adjacent grid lines on a navigation chart;
   a first plotting bar slidingly mounted on the frame for movement across the frame; a first plot line formed on the first plotting bar;
   a second plotting bar pivotally mounted on the frame at one end and movably intersecting the first plotting bar;
   a second plot line formed on the second plotting bar a portion of the second plot line overlying the navigation scale on the plate; and
   means, carried by the frame, for positioning the frame over a navigation chart with respect to the position to be plotted such that the scale increments of the position to be plotted between two adjacent grid lines on the navigation chart underlie the second grid line when the first and second plot lines are disposed in intersecting relationship over the point to be plotted.

2. The navigation position plotter of claim 1 wherein the positioning means comprises:
   means for aligning the frame over a grid line on the navigation chart adjacent to the point to be plotted; and
   a first scale indicia line formed on the plate and disposed at a predetermined angle with respect to the first plot line;
   the first scale indicia line cooperating with the aligning means and the first plot line to establish the position of the first plot line on the frame with respect to the spacing between two grid lines on the chart adjacent to the position to be plotted.

3. The navigation position plotter of claim 1 wherein the scale is divided into at least one of longitude and latitude degree minute and degree second increments.

4. The navigation position plotter of claim 1 wherein the scale is divided into Loran time delay interval increments.

5. The navigation position plotter of claim 1 wherein the scale includes a plurality of scales respectively divided for longitude and latitude minutes and seconds, and Loran time delay interval increments.

6. The navigation position plotter of claim 2 wherein the aligning means includes:
   a member movably mounted on the frame and disposed substantially perpendicular to the first plotting bar; and
   a base line formed on the movable member and adapted to be movably disposed over a grid line on the navigation chart adjacent to the position to be plotted.

7. The navigation position plotter of claim 2 wherein the aligning means includes:
   first and second members, each bearing a base line; movably mounted on the frame for movement substantially perpendicular to the first plotting bar;
   means for movably interconnecting the first and second members for simultaneous parallel movement; and
   first and second scales indicia lines formed on the plate and disposed at a predetermined angle apart.

8. The navigation position plotter of claim 7 wherein the means for movably interconnecting first and second members includes;
   pulley means mounted on the frame; and
   a cable movably engaging the pulley means and connected to opposed ends of the first and second movable members for maintaining the first and second members substantially parallel and for moving the first and second member equally toward and away from each other.

9. The navigation position plotter of claim 1 further including first means for moving the first plotting bar, the first moving means comprising:
   a slider slidingly mounted on the frame; and
   connecting means secured to the slider at one end and carrying at the other end one end of the first plotting bar;
   pulley means mounted on the frame; and
   a cable movably engaging the pulley means and connected to opposite ends of the first plotting bar such that movement of the slider causes equal movement of both ends of the first plotting bar.

10. The navigation position plotter of claim 9 further including second means for moving the plotting bar, the second moving means comprising:
    a second slider slidingly mounted on the frame; and a second connecting means secured to the second slider at one end carrying at the other end one end of the second plotting bar such that movement of the second slider causes corresponding movement of the second plotting bar.

11. The navigation position plotter of claim 1 wherein the aligning means comprises a base line indicia formed on the plate and extending perpendicular to the first plotting bar.

12. A navigation position plotter for use with a navigation chart bearing spaced navigation grid lines comprising:
    a frame;
    a plate mounted on the frame;
    a plurality of scales formed on the plate having designations corresponding to incremental longitude and latitude degree minutes and degree seconds and Loran time delay interval between two adjacent grid lines on a navigation chart;
    a base line indicia formed on the plate end extending thereacross;
    first and second scale line indicia formed on the plate and disposed at a predetermined angle on opposite sides of the base line indicia;
    a first plotting bar slidingly mounted on the frame for movement across the frame;
    a first plot line formed on the first plotting bar;
    first means for moving the first plotting bar, the first moving means comprising:
    a first slider slidingly mounted on the frame; and
    a first connecting means secured to the slider at one end and carrying at the other end one end of the first plotting bar; and
    pulley means mounted on the frame; and
    a first cable movably engaging the pulley means and connected to opposite ends of the first plotting bar such that movement of the first slider causes equal movement of both ends of the first plotting bar;
    a second plotting bar pivotally mounted on the frame at one end and movably intersecting the first plotting bar;
    a second plot line formed on the second plotting bar, a portion of the second plotline overlying the scales on the plate;
    second means for moving the plotting bar, the second moving means comprising:
    a second slider slidingly mounted on the frame; and
    second connecting means secured to the second slider at one end and carrying at the other end one end of the second plotting bar such that movement of the second slider causes corresponding movement of the second plotting bar;
    a first member and a second member, each bearing a base line indicia movably mounted on the frame for movement substantially perpendicular to the first plotting bar;
    means for movably interconnecting the first and second members including:
    pulley means mounted on the frame; and
    a cable movably engaging the pulley means and connected to opposed ends of the first and second movable members for maintaining the first and second members substantially parallel and for moving the first and second members equally toward and away from each other;
    the first and second scale indicia, the first and second members and the first plotting line cooperating to position the frame over a navigation chart with respect to the position to be plotted such that the scale increments of the position to be plotted between two adjacent grid lines on the navigation chart underlie the second plot line when the first and second plot lines are disposed in intersecting relationship over the point to be plotted.

* * * * *